Nov. 25, 1952 G. G. YOUNG 2,619,099
APPARATUS FOR WASHING, RINSING, AND
STERILIZING RACKS AND THE LIKE
Filed March 28, 1949 2 SHEETS—SHEET 1
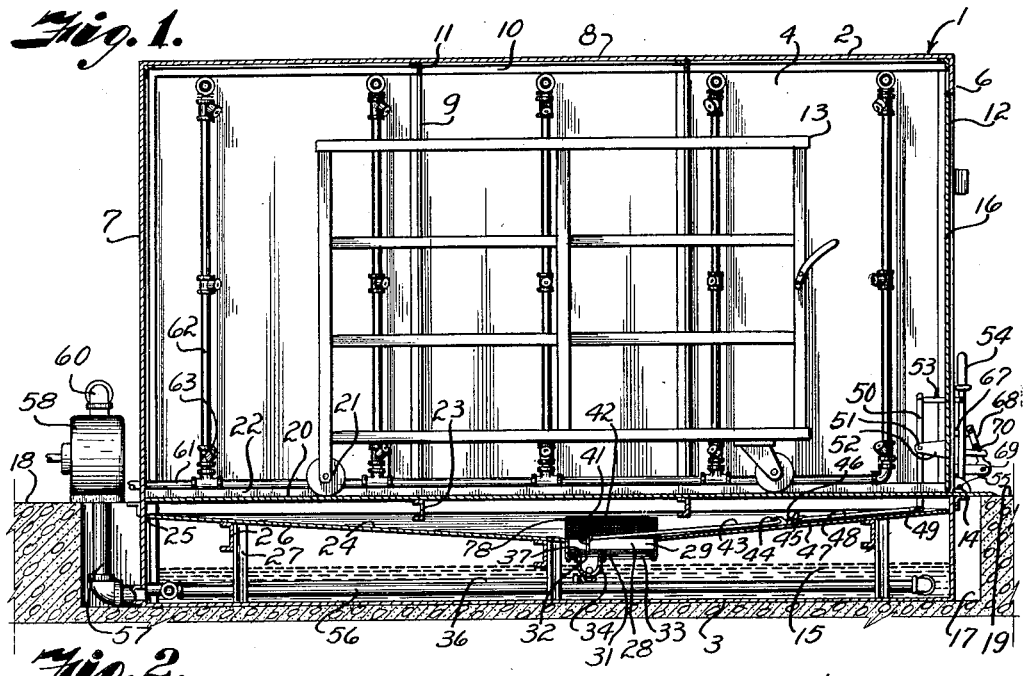
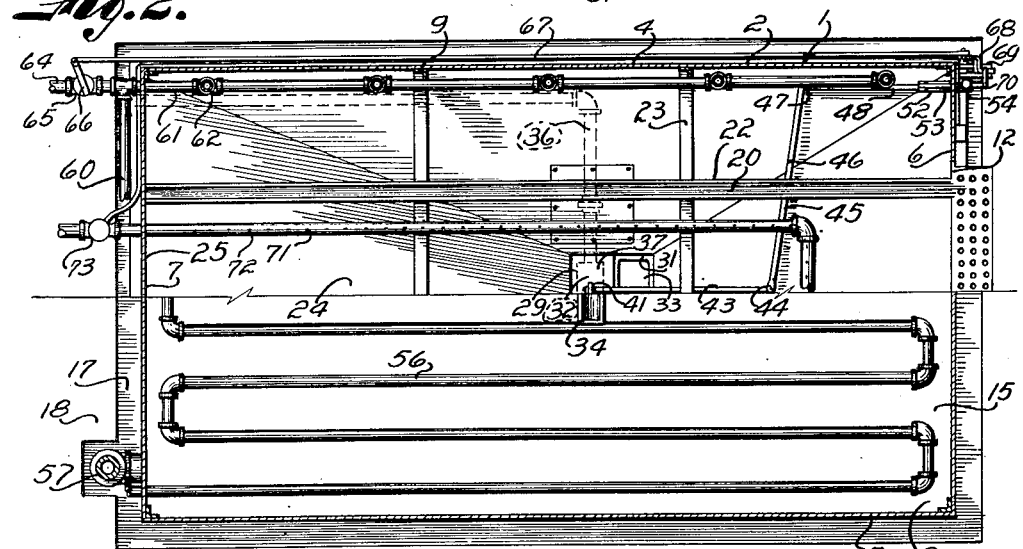
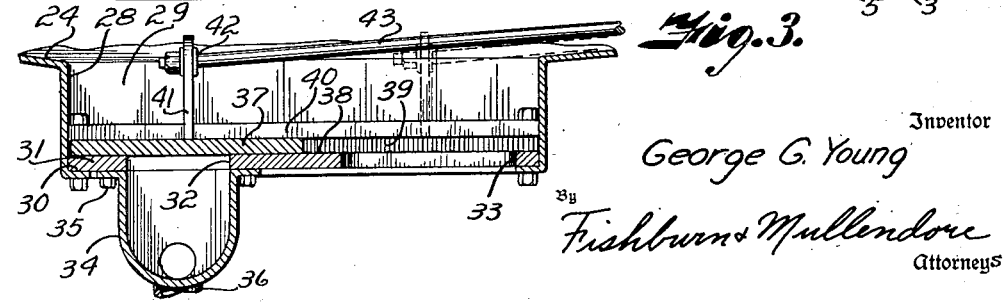
Inventor
George G. Young
By Fishburn & Mullendore
Attorneys Nov. 25, 1952 G. G. YOUNG 2,619,099
APPARATUS FOR WASHING, RINSING, AND STERILIZING RACKS AND THE LIKE
Filed March 28, 1949 2 SHEETS—SHEET 2

Inventor
George G. Young
By Fishburn & Mullendore
Attorneys

Patented Nov. 25, 1952

2,619,099

UNITED STATES PATENT OFFICE 2,619,099

APPARATUS FOR WASHING, RINSING, AND STERILIZING RACKS AND THE LIKE

George G. Young, Kansas City, Mo.

Application March 28, 1949, Serial No. 83,808

1 Claim. (Cl. 134—96)

This invention relates to apparatus for washing, rinsing and sterilizing racks and the like that are used in bakeries for carrying articles in the various processing and baking of the dough and more particularly to such apparatus for completing the entire operation in one position of the rack and with a minimum loss of washing solution.

Due to particles of dough and other material that adhere to the racks used in bakeries, it is desirable to use detergents in the washing operation. Such detergents are expensive and for maximum effects, the washing solution should be kept approximately at the optimum concentration. In conventional apparatus, the rinse water either dilutes the washing solution or large quantities of said washing solution run down the drain and are wasted.

The objects of the present invention are to provide apparatus for washing, rinsing and sterilizing racks in sequence at a single position of the racks; to provide apparatus for collecting and re-using the washing solution with substantially no waste or dilution thereof; to provide a rack washing, rinsing and sterilizing apparatus with washing and rinsing liquid supplies and drain controls for segregation of the used liquid; to provide a double drain valve fitting for controlling the disposal of the washing and rinsing liquids; and to provide an efficient, economical apparatus for cleaning racks with a minimum loss of washing solution, that is easy to manufacture and install and simple of operation.

In accomplishing these and other objects of the present invention, I have provided improved details of structure, the preferred forms of which are illustrated in the accompanying drawings, wherein:

Fig. 1 is a vertical longitudinal cross section through a rack washing, rinsing and sterilizing apparatus embodying the features of the present invention.

Fig. 2 is a horizontal sectional view through the rack enclosing housing, a portion being broken away to illustrate the washing solution sump.

Fig. 3 is a detail longitudinal sectional view through the drain valve fitting.

Figure 4:
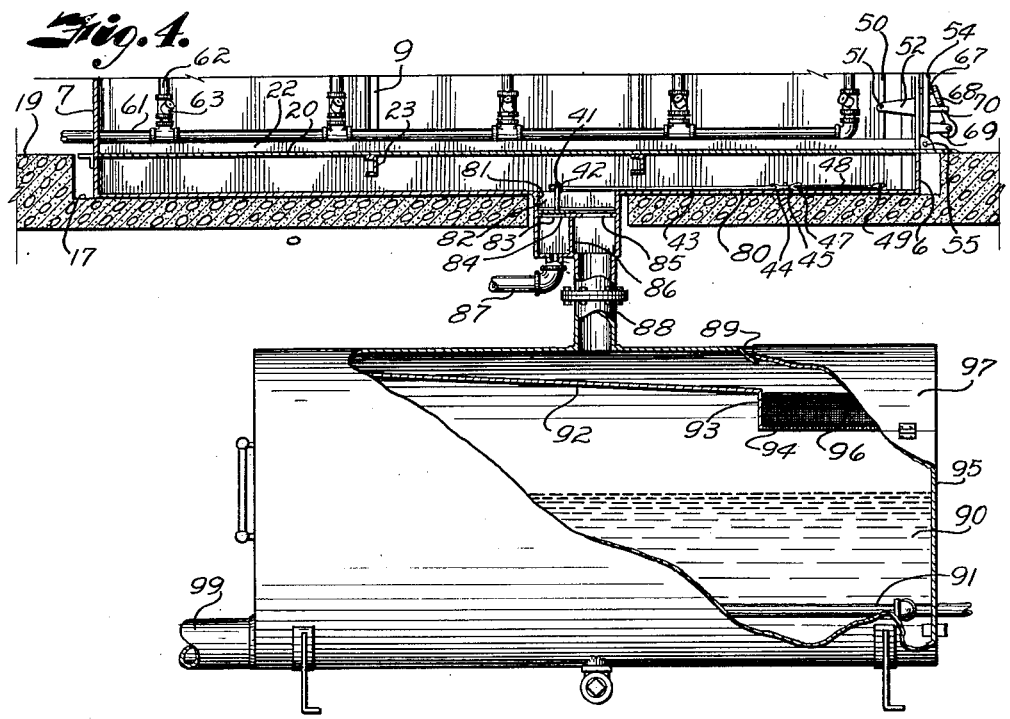
Fig. 4 is a vertical sectional view through a modified form of the washing apparatus wherein a separate tank or sump is used for the washing solution.

Referring more in detail to the drawings:

1 designates a washing, rinsing and sterilizing apparatus which includes a casing or housing 2, having a bottom 3, side walls 4 and 5, end walls 6 and 7 and a top wall 8, said walls being connected together at their corners or otherwise suitably formed to provide a watertight structure. Suitable vertical members 9, longitudinal members 10, and transverse members 11 are arranged and connected together to form a frame supporting the side, end and top walls. The front end wall 6 is provided with an opening 12 of such size to pass racks 13 for movement of said racks into the housing for the cleaning operation. The lower edge 14 of said opening 12 is spaced from the bottom 3 to provide a sump 15 of sufficient capacity in the lower portion of the housing for containing a suitable quantity of wash solution, said opening 12 preferably being only of sufficient size to pass the largest rack to be cleaned whereby there are portions of the wall 6 tending to prevent spray and the like from escaping from the housing. The opening is covered by a curtain 16 or other closure device during the actual cleaning and sterilizing operation.

The housing is preferably arranged in a pit 17 formed in a floor 18, the pit being of suitable dimensions to receive the lower portion of the housing 2 and of suitable depth whereby the lower edge 14 of the opening 12 is substantially on the same level as the surface 19 of the floor. Extending longitudinally of the housing 2 on the level of the lower edge 14 of the opening 12 are spaced track members 20 for receiving wheels 21 of the rack 13, said track members preferably having upwardly extending flanges 22 forming guides for retaining the wheels on said tracks. The track members are preferably connected at their ends to the respective end walls of the housing, and the center portion supported by suitable structural members 23 extending transversely of the housing and having their ends connected to the vertical members 9, there being sufficient transverse members 23 to adequately support the weight of the racks to be cleaned.

An inner pan or partition 24 is arranged in the housing with the peripheral edges engaging and secured to the side and end walls of the housing as at 25. The inner pan 24 is preferably below the tracks 20 and spaced above the bottom 3 to close the top of the sump 15. The inner pan preferably slopes downwardly from each of the side and end walls toward the center of the housing to facilitate movement of liquid thereover. Suitable structural members 26 are arranged transversely under the inner pan to support same, said transverse members being secured to vertical members 27 extending upwardly from the bottom 3 to provide adequate support for the inner pan. The inner pan is preferably provided with downwardly turned flanges 28 (see Figure 3) adjacent the center of the pan to form a valve receiving well 29, the lower ends of the flanges being turned inwardly forming shoulders 30 for supporting a plate 31 closing the bottom of the well 29, said plate having longitudinally spaced openings 32 and 33 for drainage of liquid from the portion of the housing above the inner pan 24. The opening 33 drains directly into the sump 15 and the opening 32 drains into a fitting 34 secured by suitable fastening devices 35 to the bottom of the plate 31, said fitting extending completely around the opening 32. The fitting 34 is provided with a drain connection 36 connected to the sewer or other suitable disposal. To control the drainage of liquid through the openings 32 and 33, a valve 37 is slidably mounted on the upper face 38 of the plate 31, the side edges of the valve 37 being engaged in grooves 39 in upwardly extending side walls 40 of the plate 31 to retain the valve 37 in sliding relation with the plate 31.

Figure 5:
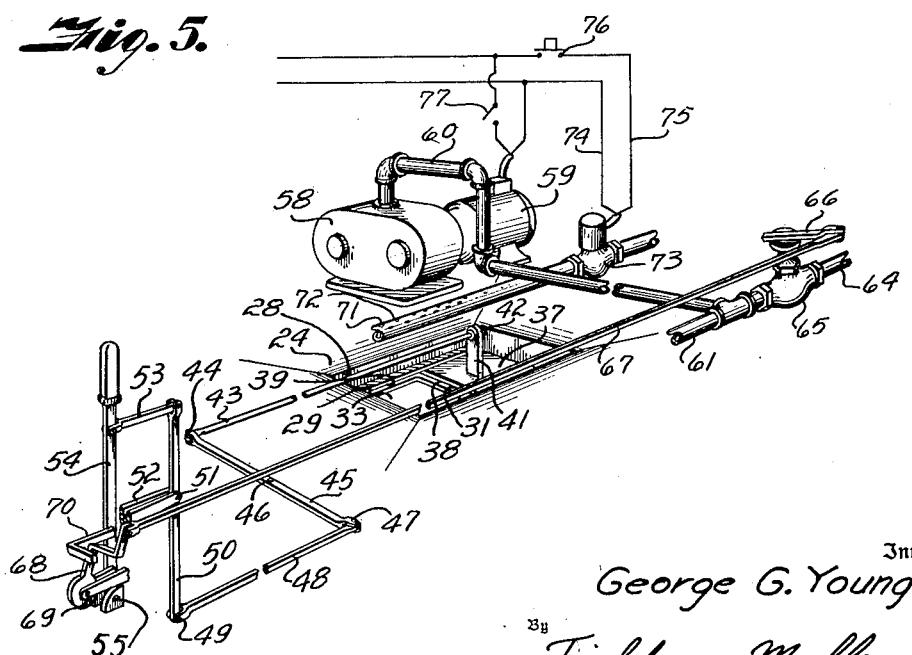
Fig. 5 is a diagrammatic perspective view of the drain valve, washing solution pump, rinse water and steam valves and the controls therefor.

The valve 37 is preferably substantially half the length of the plate 31 whereby the valve 37 may be moved longitudinally to selectively close the openings 32 and 33. The valve is preferably operated from a suitable control arranged exteriorly of the housing, for example the valve 37 has an upwardly extending ear 41 connected as at 42 with a rod 43 extending toward the front of the housing. The forward end of the rod 43 is pivotally connected as at 44 (see Fig. 5) to a lever 45 pivotally mounted as at 46, the opposite end of the lever 45 being connected as at 47 with a rod 48 having its other end connected as at 49 with a lower end of a lever 50. The lever 50 is preferably pivotally mounted as at 51 on brackets 52 located adjacent the forward wall 6, the upper end of the lever 50 being connected by a link 53 with a hand lever 54 pivotally mounted as at 55. Obviously other suitable leverages and linkages may be used for moving the valve 37, the particular system illustrated being merely for example only.

A heating coil 56 is located in the sump 15 and adapted to be connected with a steam or other suitable heating system for heating the wash solution in the sump 15. Connected to the lower portion of the housing and having communication with the sump is a pipe 57 leading to a pump 58 suitably driven by a motor 59 for pumping the wash solution from the sump 15, the discharge of said pump being connected by a pipe 60 to a manifold pipe 61 arranged adjacent the floor level and having connection with a plurality of pipes 62 each carrying a plurality of nozzles 63. The pipes 62 preferably extend upwardly on both sides of the housing 2 and across the top thereof, each portion of said pipe carrying a plurality of the nozzles which are directed toward the position of the rack in the housing whereby the jets of liquid will be directed upwardly, downwardly and laterally onto said rack to thoroughly clean the racks, the force of the jets aiding in removing any particles of dough or other material from the rack.

Also connected to the manifold 61 is a water supply line 64 connected to the city water supply or other source of supply of rinse water. The line 64 is provided with a valve 65 controlled by a valve lever 66 which is connected by a link 67 with a lever 68 pivotally mounted as at 69 adjacent the pivotal mounting of the hand lever 54, the hand lever 54 preferably having an arm 70 thereon adapted to engage the lever 68 whereby when the hand lever 54 is moved to close the opening 32 the valve 65 is operated to cut off the supply of rinse water.

Located substantially alongside of the tracks 20 are steam pipes 71 having a plurality of perforations 72 therein, said steam pipes being connected to a suitable source of supply of steam and having a valve 73, preferably of the solenoid type connected by electric conductors 74 and 75 with a suitable source of supply of electric current, a push button switch 76 being arranged in the circuit whereby, when the push button is moved to close the circuit, the valve 73 is opened. When the push button 76 is released the valve returns to closed position. Also connected to the conductors 74 and 75 are branch lines leading to the motor 59, a switch 77 being located in said conduits for control of said motor. It is preferable to have a wire or other suitable perforated metal screen 78 removably mounted on the inner pan 24 in covering relation to the well 29 whereby all of the liquid draining therein will be strained to remove particles therefrom.

In operating a device constructed as described, the sump 15 in the lower portion of the housing 2 is filled with a suitable washing solution having the optimum concentration of detergent. The hand lever 54 is moved to position the valve 37 in closing relation to the opening 32. This movement of the hand lever effects engagement of the arm 70 with the lever 68 to move same whereby through its connection with the link 67 the valve lever 66 is operated to close the valve 65. The rack 13 is then rolled into the housing 2, the wheels 21 resting on the tracks 20. The opening 12 in the forward wall 6 may then be closed and the switch 77 operated to close the circuit to the motor 59 to effect operation of the pump 58 to pump the washing solution from the sump 15 through the pipe 60, manifold 61, pipes 62, nozzles 63 to direct a plurality of jets toward the rack, said jets impinging thereon from below, the sides, ends, and from the top to knock particles from the rack as well as thoroughly washing same.

After the rack is thoroughly washed, the switch 77 is moved to break the circuit to the motor 59 to stop the pumping action and jets of wash solution on the rack. The hand lever 54 is then moved to operate the leverage and linkage connected thereto moving the valve 37 into closing position relative to the opening 33. This movement opens the opening 32 but does not move the lever 68. The lever 68 is then moved to operate the valve 65 to open same whereby the rinse water flows through the manifold 61, pipe 62 and nozzles 63 to jet rinse water over the racks, said rinse water dropping onto the inner pan 24, flowing down the sloping sides thereof into the well 29, through the opening 32, fitting 34 and connection 36 to a suitable disposal, any particles knocked from the racks being caught by the screen 78. After a suitable period of rinsing the lever 68 is moved to close the valve 65 to shut off the supply of rinse water. The push buttons 76 is then moved to complete the circuit to the solenoid valve 73, opening same whereby a supply of steam is directed into the housing 2, said steam sterilizing the rack 13 and also tending to remove or evaporate any water particles thereon. After a suitable period of steam supply, the push button 76 is released whereby the valve 73 is closed, then the opening 12 may be uncovered and the rack rolled from the housing.

In the form of the invention illustrated in Fig. 4, the upper portion of the housing is constructed in the same manner as in the form shown in Fig. 1, however there is no inner pan. The bottom wall 80 is provided with downwardly turned portions 81 forming a well 82 in which is mounted a valve 83 slidable longitudinally of the housing to close openings 84 and 85. A partition 86 divides the lower portion of the well whereby the portion under the opening 84 is connected to a suitable pipe 87 leading to a disposal such as the sewer. The bottom of the portion of the well under the opening 85 is connected by a suitable pipe 88 with a tank or sump 89 whereby when said opening 85 is open liquid will flow therethrough and through the pipe 88 into the upper portion of the tank 89.

The tank 89 may be of any suitable shape and adapted to contain a wash solution 90 in the lower portion thereof. Immersed in the washing solution are heating coils 91 for maintaining the washing solution at the desired temperature. Arranged in the upper portion of the tank 89 is a baffle 92 sloping longitudinally of the tank. The lower end of the baffle is provided with a downwardly turned wall 93, the lower end of which is connected by a perforated partition 94 with the end wall 95 of the tank, said perforated partion being adapted to support a suitable mesh or otherwise perforated metal basket 96 to form a strainer to remove particles from the liquid draining into the tank. The tank preferably has a hinge cover 97 adjacent the strainer to facilitate removal and cleaning thereof. Connected to the tank adjacent the bottom thereof is a conduit 99 communicating with a pump for pumping the washing solution into the wash housing for washing racks. The operation of the modified form is substantially the same as that of the form shown in Fig. 1.

It is believed obvious that I have provided an apparatus for washing, rinsing and sterilizing racks in sequence at a single position of the racks that is efficient and economical, operating with a minimum loss or dilution of the washing solution.

What I claim and desire to secure by Letters Patent is:

A rack washing apparatus comprising, a housing enclosing a washing chamber for receiving racks to be washed, a sump below the washing chamber for containing a washing liquid, means in the sump for heating the washing liquid, a support in the washing chamber for racks to be washed, liquid discharge pipes and nozzles adapted to direct liquid in inclined directions against the rack to be washed, means for pumping wash liquid from the sump to the discharge pipe under pressure for effecting jets of said liquid from the nozzles, a valve controlled rinse liquid supply connected to the discharge pipes for applying jets of said rinse liquid from the nozzles, a partition in the housing separating the washing chamber and sump for catching liquid discharged from the nozzles, a drain means in the partition and having a flat bottom with spaced openings one communicating with the storage sump and the other with a waste disposal, a flat valve slidable on the drain means bottom and movable to open one of said openings and close the other, a hand lever having connection with the flat valve for operating same, a second lever for operating the valve controlling the rinse liquid supply, and means on the hand lever engageable with the second lever to simultaneously operate same for cutting off the supply of rinse liquid to the spray nozzles when the flat valve is moved to its position opening the drain to the sump, said means permitting independent operation of the hand lever to move the flat valve from its position closing the drain to the waste disposal to its position closing the drain opening to the sump and permitting independent operation of the second lever to effect operation of the rinse water supply only when the flat valve is in its position opening the drain to the waste disposal.

GEORGE G. YOUNG.

REFERENCES CITED

The following references are of record in the file of this patent:

UNITED STATES PATENTS

| Number | Name | Date |
|---|---|---|
| 883,132 | Goff | Mar. 24, 1908 |
| 1,670,611 | Couch | May 22, 1928 |
| 1,690,449 | Jourdan | Nov. 6, 1928 |
| 2,025,592 | Kelly | Dec. 24, 1935 |
| 2,255,859 | Quigley | Sept. 16, 1941 |
| 2,465,562 | Hopper et al. | Mar. 29, 1949 |
| 2,471,506 | Wiswall | May 31, 1949 |